United States Patent [19]

Tracy et al.

[11] Patent Number: 4,795,257
[45] Date of Patent: Jan. 3, 1989

[54] POLYCHROMATOR FOR MULTI-ELEMENT ANALYSIS

[75] Inventors: David H. Tracy, Norwalk; Stephen A. Myers, Old Greenwich, both of Conn.

[73] Assignee: The Perkin-Elmer Corporation, Norwalk, Conn.

[21] Appl. No.: 24,237

[22] Filed: Mar. 10, 1987

[51] Int. Cl.⁴ ............................ G01J 3/20; G01J 3/36
[52] U.S. Cl. .................................... 356/328; 356/334
[58] Field of Search ............... 356/305, 313, 328, 334

[56] References Cited

U.S. PATENT DOCUMENTS 2,937,561  5/1960  Saunderson et al. ........... 356/313 X
4,030,828  6/1977  Sonobe et al. .................. 356/334 X
4,340,303  7/1982  Grisar et al. ........................ 328 X/

OTHER PUBLICATIONS von Arx "A Grating Spectrograph for Use in Qualitative Analysis", J. of Chemical Education, Sep. 1942, pp. 407–410.

Primary Examiner—Vincent P. McGraw
Attorney, Agent, or Firm—Thomas P. Murphy; Edwin T. Grimes; Paul A. Fattibene

[57] ABSTRACT

A Rowland circle-type polychromator with the Rowland circle arc pivotally connected to the concave grating. Separate adjustments are provides for shifting the spectral lines and focussing. A tie rod is used to adjust the focus of the spectral lines. Dectectors are predeterminedly spaced along the arc to simultaneously detect unique spectral lines for analysis of multiple elements contained in a single sample.

6 Claims, 2 Drawing Sheets

POLYCHROMATOR FOR MULTI-ELEMENT ANALYSIS

FIELD OF THE INVENTION

This invention relates generally to the field of spectrometry and more particularly to an improved Rowland circle polychromator.

BACKGROUND OF THE INVENTION

The use of atomic absorption spectrometers to perform chemical analysis based on the absorption or attenuation by matter of electromagnetic radiation of a specific wavelength is well known. An analysis of the spectrum of light passed through a sample provides information regarding the composition of the sample. In one type of spectrometer, a concave grating is used to focus the spectrum on a circular circumference known as the Rowland circle. The use of Rowland circles in spectrometry is well known. Although the use of a concave grating to focus spectrum along the Rowland circle is advantageous, the geometries required have been difficult to obtain and adjust for optimum performance. Independent adjustments for shifting the spectrum along the Rowland circle and focussing it thereon are not possible with prior art devices. The use of photomultiplier tubes to detect the spectrum lines along the Rowland circle is also well known. Typically, the photomultiplier tubes would be spaced along the Rowland circle at predetermined locations to detect specific spectrum lines characteristic of a specific element attempting to be identified. While this direct reading method was acceptable in many instances, difficulties were encountered when multiple elements needed to be detected in a single sample and the spectrum to be detected was physically closer than the photomultiplier tubes were able to be positioned.

SUMMARY OF THE INVENTION

The present invention provides a kinematically correct unit that provides independent adjustments for shifting the spectrum along the circumferential portion of the Rowland circle and focussing the spectrum thereon. The present invention also provides predeterminedly spaced photomultiplier tubes along the circumference of the Rowland circle for detecting multiple elements simultaneously with only one sample. The present invention comprises a concave grating placed at one end of and between two grating support straps. The other end of the grating support straps are pivotally connected to a slit arc assembly. Mounted on the slit arc assembly on the top and bottom portions thereof are a plurality of photomultiplier tubes predeterminedly spaced. A tie rod connects one end of the grating support straps and one end of the slit arc assembly to provide a focussing adjustment.

It is an objective of this invention to provide a compact and stable polychromator.

It is yet another objective of this invention to provide a polychromator with improved optical alignment.

It is an advantage of this invention that multiple elements can be detected from a single sample.

It is yet another advantage of this invention that separate focussing and spectrum shifting adjustments can be made.

It is a feature of this invention that the grating support straps are pivotally connected to the slit arc assembly.

It is yet another feature of this invention that the photomultiplier tubes are predeterminedly spaced to detect characteristic spectral analytical lines for a plurality of elements.

These and other objects, advantages, and features will become readily apparent in view of the following more detailed description.

DETAILED DESCRIPTION OF THE PREFERRED EMBODIMENT

Figure 1:
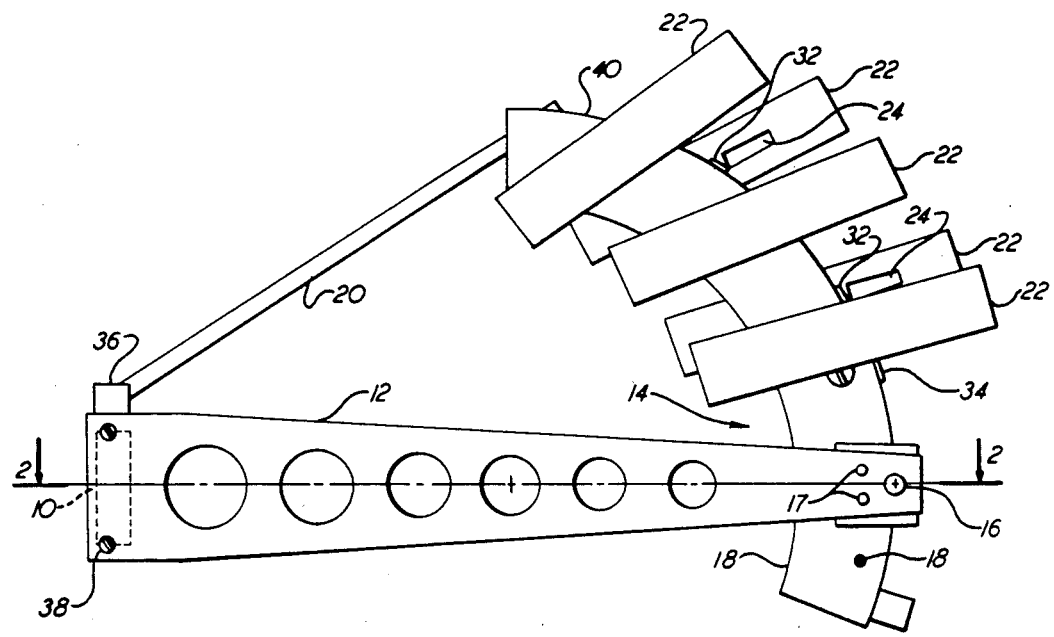
FIG. 1 is a top plan view of the invention.

In FIG. 1 the polychromator of the present invention is shown. A concave diffraction grating 10 is mounted between a pair of grating support straps 12. Grating 10 is mounted so that there is a grating adjustment means 38 for adjusting or shifting the spectrum along the slit circle 40. One end of the grating support straps 12 are pivotedly connected to slit circle rails 18 by pivot pin 16. Pivot pin 16 is located at the center of curvature of grating 10. Rails 18 comprise a portion of a circle having a diameter equal to the radius of the circle formed by the curvature of the grating 10. Slit circle 40 is the outer perimeter of the slit circle rails 18. Therefore, slit circle 40 is known as the Rowland circle. Mounted on slit circle rails 18 are photomultiplier tubes 22, exit slits 32, entrance slit 34, and folding mirrors 24 forming slit arc assembly 14. The photomultiplier tubes 22 are predeterminedly spaced to detect the uniquely identifying spectrum of the elements to be detected. Each photomultiplying tube 22 is precisely positioned to detect a spectral analytical line unique to one element. Therefore, the positioning of the tubes 22 is determined by the various elements being detected. Tie rod 20 is attached between slit arc assembly 14 and the grating support straps 12. Tie rod 20 is adjustably mounted on straps 12 by adjusting means 36 for adjusting the focus of the spectrum on slit circle 40. After the focussing adjustment is made straps 12 can be secured to slit arc assembly 14 by bolts 17. In operation, a hollow cathode lamp would be used to direct a light beam through the vapor of a heated sample and then through entrance slit 34.

Various spectral portions of the light will be absorbed upon passing through the sample and will therefore alter the spectrum as seen along slit circle 40. The spectral analytical lines formed can therefore be used to uniquely identify and quantify the element or a series of elements being detected for. The light, after passing through entrance slit 34, impinges upon concave grating 10 resulting in a spectrum being focussed on the slit circle 40. The tubes 22 can then uniquely identify and quantify the elements being detected for. The photomultiplier tubes 22 are mounted on both sides of slit arc assembly 14. The spectrum lines falling on slit circle 40 pass through exit slits 32 and are then directed to photomultiplier tubes 22 by folding mirrors 24. This makes possible the detection of spectral analytical lines that are so closely spaced so as to prohibit placement of adjacent tubes 22.

Figure 2:
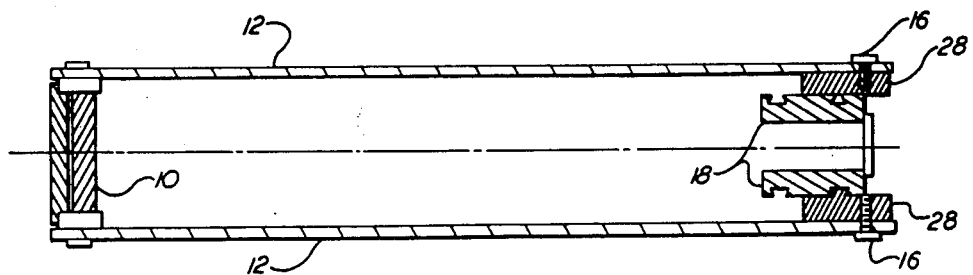
FIG. 2 is a cross-section taken along Line 2—2 in FIG. 1.

In FIG. 2, the slit circle rails 18 can better be seen. Slit circle rails 18 are mounted on pivot blocks 28. Pivot blocks 28 are then pivotally connected to straps 12.

Figure 3:
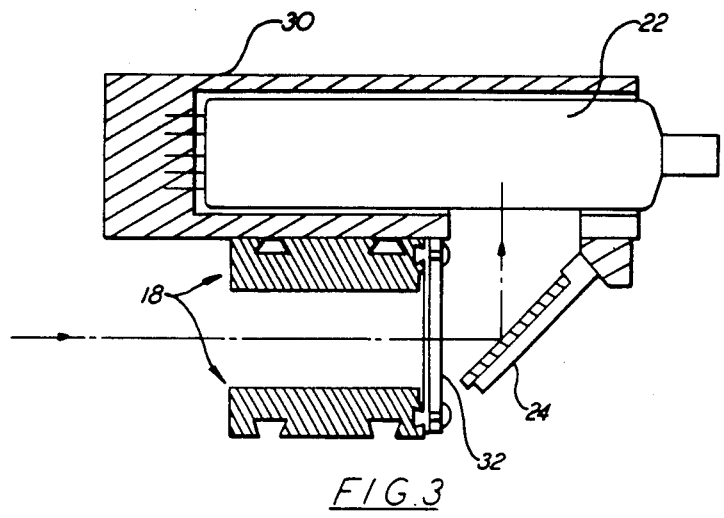
FIG. 3 is a cross-section taken along Line 3—3 in FIG. 4.

In FIG. 3, a cross-section of one of the tubes 22 mounted on slit arc assembly 14 is shown. Tube 22 is mounted in a socket 30 which is attached to rails 18. Between rails 18, exit slit 32 is positioned. On a portion of socket 30 is mounted a folding mirror 24. Light after leaving grating 10 is broken into spectrum lines that fall along the circumference of slit circle 40. Exit slit 32 is predeterminedly positioned to permit a spectral line characteristic of a specific element to pass through, striking folding mirror 24 and being detected by tube 22. The placement of exit slit 32 will vary depending on the specific element being detected.

Figure 4:
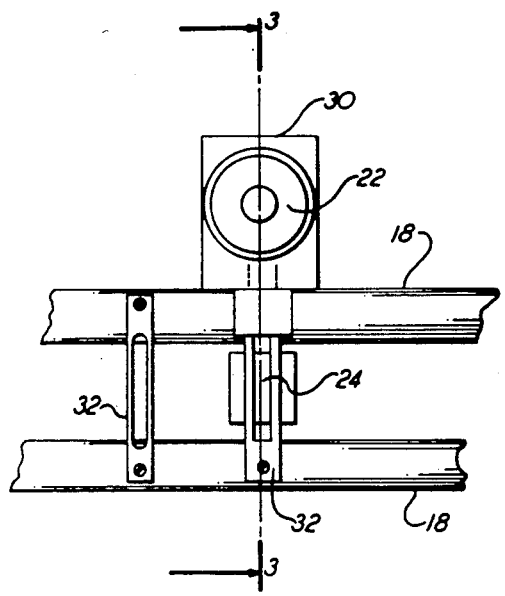
FIG. 4 is a front elevational view of a portion of the invention.

FIG. 4 illustrates a portion of slit arc assembly 14 showing several of the exit slits 32. The purpose of exit slits 32 is to prevent stray spectral analytical lines from being detected by tubes 22. The positioning of slits 32 is critical in that they must correspond to the uniquely identifiable location of spectral analytical lines selected to uniquely identify the elements being detected.

Although the preferred embodiment has been illustrated and described, it will be obvious to those skilled in the art that various modifications may be made without departing from the spirit and scope of the invention.

We claim:

1. A polychromator for multi-element analysis comprising:
   a pair of straps;
   a concave grating mounted between said pair of straps at one end;
   an arc pivotally mounted to the other end of said pair of straps at the radius of curvature of said concave grating, said arc having a radius of curvature equal to one-half said radius of curvature of said concave grating;
   a tie rod connected between said one end of said pair of straps and the free end of said arc;
   means for adjusting the length of said tie rod; and
   a plurality of detectors predeterminedly spaced along said arc whereby a plurality of spectral lines can be detected for analyzing multiple elements in a sample.

2. A polychromator as in claim 1 further comprising:
   adjusting means, attached to said grating, for moving said grating causing the spectral lines along said arc to shift.

3. A polychromator as in claim 1 further comprising:
   securing means for securely fixing said pair of straps to said arc after adjusting said tie rod.

4. A polychromator as in claim 1 wherein:
   said plurality of detectors are spaced along said arc to uniquely identify multiple predetermined elements.

5. A polychromator as in claim 4 wherein:
   said plurality of detectors are mounted on two sides of said arc.

6. A polychromator as in claim 5 further comprising:
   folding mirror means, attached to said arc, for directing a spectral line to each said plurality of detectors.

* * * * *